United States Patent [19]

Waldman et al.

[11] 4,001,520

[45] Jan. 4, 1977

[54] HOLD CIRCUIT FOR TELEPHONES

[76] Inventors: Herbert H. Waldman, 1739 52nd St., Brooklyn, N.Y. 11204; Kalju Meri, 60-67 70th St., Maspeth, N.Y. 11378

[22] Filed: Feb. 20, 1975

[21] Appl. No.: 551,285

[52] U.S. Cl. .................................. 179/81 R; 179/99
[51] Int. Cl.² .......................................... H04M 1/00
[58] Field of Search ........................... 179/81 R, 99

[56] References Cited
UNITED STATES PATENTS

| | | | |
|---|---|---|---|
| 2,306,203 | 12/1942 | Anderson | 179/81 R |
| 3,725,600 | 4/1973 | Hutton | 179/99 |
| 3,733,442 | 5/1973 | Lee | 179/99 |
| 3,742,151 | 6/1973 | Ruether | 179/99 |
| 3,870,831 | 3/1975 | McCarley | 179/81 R |

Primary Examiner—Kathleen H. Claffy
Assistant Examiner—Joseph A. Popek
Attorney, Agent, or Firm—Friedman, Goodman & Teitelbaum

[57] ABSTRACT

A hold circuit for telephones which includes a relay having a coil and normally open contacts. A normally open momentary contact switch is connected in series with the relay coil, the series combination being connected across the telephone lines. The contact switch is connected in parallel to the normally open contacts of the relay. The hold circuit captures or holds the telephone lines when the contact switch is closed and permits the telephone lines to be released upon removing the telephone handset "off the hook." In one embodiment, a parallel connection of a lamp and a capacitor is connected in series between the relay contacts and the relay coil to form a voltage divider when the relay contacts are closed.

18 Claims, 7 Drawing Figures

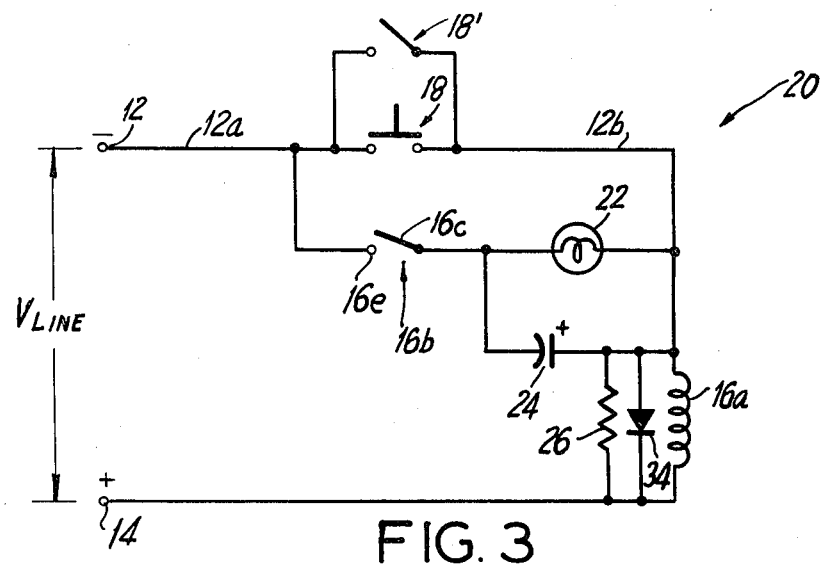
FIG. 3
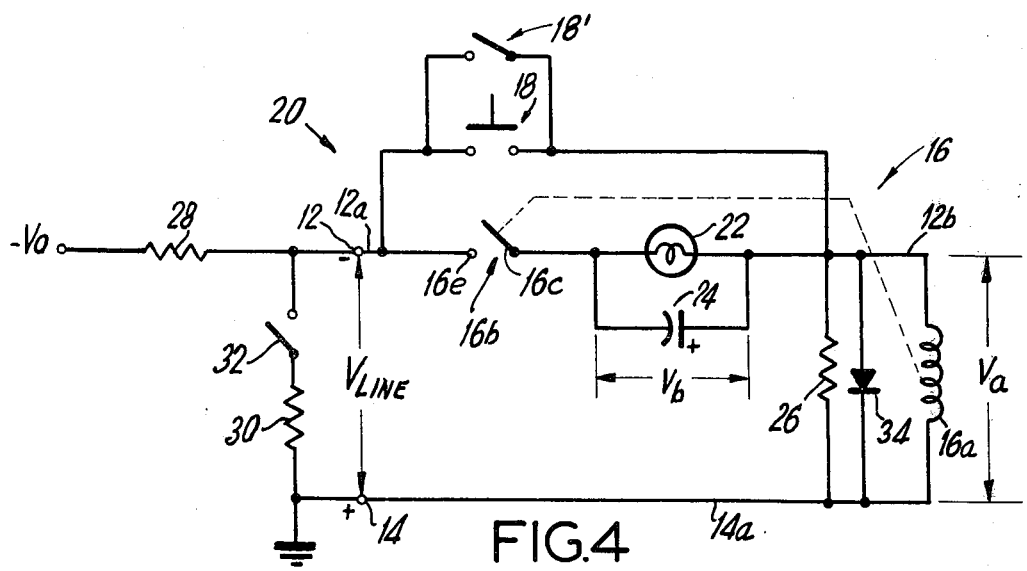
FIG. 4
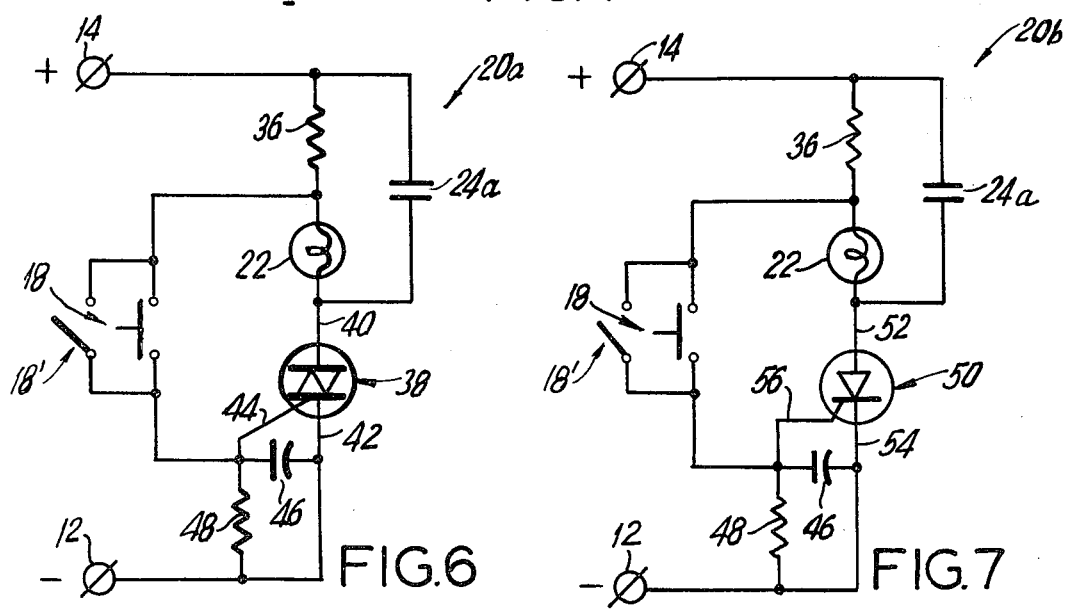
FIG. 6
FIG. 7

HOLD CIRCUIT FOR TELEPHONES

BACKGROUND OF THE INVENTION

The present invention generally deals with telephone switching circuits, and more specifically to an automatic release telephone line "hold" circuit.

Hold buttons on telephone units are well known, particularly with telephone instruments which have a plurality of buttons representing two or more incoming lines. However, the hold buttons which are provided on the present telephone devices are generally available only if two or more separate lines are made available to the subscriber. The hold circuitry which is presently available is relatively complex in construction and requires a special, costly installation. For example, with respect to the telephone company's system, each telephone line requires two individual relays, a line relay and a hold relay in addition to an auxiliary power supply to power the company's hold system. Additionally, the telephone companies which offer this service charge an additional monthly fee for the privilege of having this feature.

For the above-mentioned reasons, the hold feature on telephones has generally not been available or extensively used in the home. Accordingly, it has not heretofore been possible to place another party to a telephone discussion or conversation on a single line unit in a "hold" condition. Such, however, is frequently desirable both for reasons of occurrence of intervening circumstances which must receive immediate attention and for the purpose of obtaining a degree of privacy and preventing the other party to the telephone discussion from hearing confidential material at the subscriber's location.

Another problem frequently occurs in the home, where more than one telephone handset or multiple extensions are provided at different locations in connection with a single telephone line. It frequently occurs under these circumstances that a party to a telephone conversation wishes to continue the same at a different location or on a different extension. It has been necessary heretofore to leave the handset "off the hook," go to the other desired location and pick up the phone at that location. However, the telephone which has been taken off the hook at the first location remains off the hook. If there are any noises at the first location, these will be heard by both parties. To eliminate such interference, it is necessary, in such an instance, that another party be instructed to hang up the phone after the phone has been picked up at the second location. This is clearly an inconvenience. It has not been possible heretofore for the receiver at the first location to be placed "on the hook" prior to picking up the phone in the second location since such action, particularly by the calling party, releases the lines within a very short period of time. Furthermore, if the telephone handset at the first location is unwittingly not returned to "on hook" condition for any reason, i.e. forgetfullness, carelessness etc., the telephone service of the subject telephone will be completely impaired for all incoming calls. Outgoing calls service, as well, will also be inhibited until the telephone extension with the "off-hook" handset will be searched out and located and replaced on its telephone instrument cradle rest.

The instant invention provides an automatic hold circuit which upon actuation permits the telephone to be hung up at the first location, said hold circuit operating to maintain the telephone lines in a captured condition but nonetheless upon removal of the handset of an associated extension telephone, the "hold" mode of the instant hold circuit is released and defeated so that upon hang up of the handset of the associated telephone, the telephone circuit network is restored to its normal standby condition.

The above cited feature of the invention makes it very suitable and useful in situations where all incoming calls to a first telephone are answered at a first location and the desired called party is then paged to respond to the call at an associated extension telephone located at a second location. In this instance, the answering party at the first location by utilizing the hold device of the instant invention may hang up the handset of the first telephone without disconnecting the calling party, without causing release of the telephone lines prior to the called party having responded to the call on the extension telephone at the second location. The called party upon lifting off the telephone handset at the second location causes an automatic release of the instant hold circuit's seizure of the associated telephone lines.

A further salient feature of the present invention is its ability to sense a disconnect pulse over the telephone lines and responding to same by terminating its seizure of the telephone lines. This facility of the invention is most advantageous in the event the party to a telephone conversation having been placed on "hold" hang up before the conversation is resumed. Shortly following such "hang up" by the "held party" the disconnect pulse appearing across the telephone lines will automatically disable the instant hold circuit and the telephone circuit network will be restored to its associated normal standby condition.

The present invention is for a simple circuit which can be easily installed and which is useful even where one telephone line is involved having multiple extensions. The hold circuit can provide all the advantageous features of the hold button on conventional telephone instruments. However, the present hold circuit is simple in construction and economical to manufacture and can be connected to a subscriber's telephone lines with minimum effort. For these reasons, the hold circuit to be described is useful in both home and in commercial establishments.

The present invention also permits a person to "busy out" his telephone line in order to prevent disturbances due to telephone ringing.

The present invention facilitates the ability to determine whether any extension phone is in use without the need for lifting the handset of an associated extension phone, thereby circumventing eavesdropping on a telephone conversation which presently is in process.

SUMMARY OF THE INVENTION

Accordingly, it is an object of the present invention to provide a telephone hold circuit which is utilized with telephone instruments or sets which do not have a hold button.

It is another object of the present invention to provide a hold circuit for telephones which is simple in construction and economical to manufacture.

It is still another object of the present invention to provide a telephone hold circuit of the type above suggested which can be easily installed.

It is yet another object of the present invention to provide an automatic hold circuit for a telephone which automatically terminates the hold mode thereof as soon as an associated telephone receiver is removed "off the hook."

It is a further object of the present invention to provide a telephone hold circuit which operates equally effectively with variable telephone line voltages.

It is still a further object of the present invention to provide a hold circuit as described in the last object which includes a latching device or element which is deenergized when the hold circuit is in a condition to release the telephone line, the latching device or element becoming deenergized independently of variable line voltages by reason of the application of a reverse polarity across the device or element when a handset is removed "off hook."

It is yet a further object of the present invention to utilize an automatic release hold circuit which utilizes a relay having a non-critical range of voltages between the pull-in and release voltages of the relay to thereby assure automatic release of the telephone lines after a handset has been taken "off" and ultimately replaced back "on hook" upon termination of the call in process.

It is an additional object of the present invention to provide an automatic release hold circuit which includes indicating means for indicating when the hold circuit has captured and retains the telephone lines in a hold mode.

It is an additional object of the present invention to provide an automatic release hold circuit which will permit a telephone subscriber to "busy out" his telephone line enabling him to insulate himself from the annoying intrusion of the telephone bell ring, at any time, at his convenience and option, without having to remove the telephone handset from its cradle rest.

It is yet a further object of the present invention to provide a telephone hold circuit which includes indicating means which can be used to detect if any telephone extension is in use without having to lift the handset of an associated extension phone and thereby reducing the incidence of eavesdropping on an ongoing conversation.

According to the broader features of the present invention, a hold circuit for a telephone connected across telephone lines, which exhibit a higher voltage when the telephone handset is supported in the telephone cradle or "on the hook" and a lower voltage when the telephone handset is removed from the cradle or "off the hook," comprises a pair of terminals connectable to a pair of telephone lines. A latching element is connected across the telephone lines. For example, a relay may be providing having a coil and normally open contacts. A normally open momentary contact switch is provided, said contact switch and relay coil being connected in series to each other and the series combination being connected across said pair of terminals for connection across the telephone lines. Said contact switch being in parallel circuit connection to the normally open contacts of said relay. The range between the pull-in and release voltages of said relay is smaller and is included within the range of voltages on the telephone lines. In this manner, the hold circuit is activated when said temporary contact switch is maintained closed while the telephone handset is placed "on the hook." This further permits the hold circuit to be released upon removing the telephone handset "off the hook." Semiconductor or other latching elements may also be used in place of the relay with modifications of the circuit.

Since the higher and lower telephone line voltages and available currents may vary in magnitude, the presently preferred embodiment of the hold circuit advantageously further comprises resistance means and a capacitor connected in parallel with said resistance means. The latter parallel combination is connected in series with said relay contacts. Said resistance means and said relay coil forming a voltage divider when said relay contacts are closed. Said resistance means has a resistance greater than the effective resistance of said relay coil to insure that the voltage across the capacitor is greater than the voltage across said relay coil in a steady state condition after the relay contacts have closed. In this manner, removing the telephone handset "off the hook," after having activated the subject hold circuit, causes a reversal of polarity of voltage across the relay coil, with subsequent deterioration of said voltage to a zero voltage condition, to cause said relay coil to become deenergized and the hold circuit placed in condition for releasing the telephone lines. Advantageously, said resistance means comprises a lamp to provide a visual indication when the relay coil is energized and the hold circuit is holding the telephone lines.

Where the resistance of the relay coil is greater than the resistance of the resistance means, a resistor is advantageously shunted across the relay coil to reduce the effective resistance of the relay coil in the divider to provide the above described voltage relationships and reversal in voltage polarity across the relay coil.

BRIEF DESCRIPTION OF THE DRAWINGS

FIG. 3 is a schematic representation of an electrical circuit similar to that shown in FIG. 1, but including a lamp for providing an indication of a line hold condition and including a capacitor across the lamp to adapt the circuit to widely varying line voltages and for insuring automatic release of the hold circuit subsequent to having been activated when the telephone handset is removed "off hook";

FIG. 4 is similar to FIG. 3 but redrawn to indicate the various voltage relationships which exist in the circuit of FIG. 3 when the circuit is connected to a pair of telephone lines;

FIG. 6 is an electrical schematic representation of another embodiment of the present invention, showing the use of a Triac in place of the relay; and FIG. 7 is similar to FIG. 6, but showing an SCR in place of the Triac.

DESCRIPTION OF THE PREFERRED EMBODIMENTS

Figure 1:
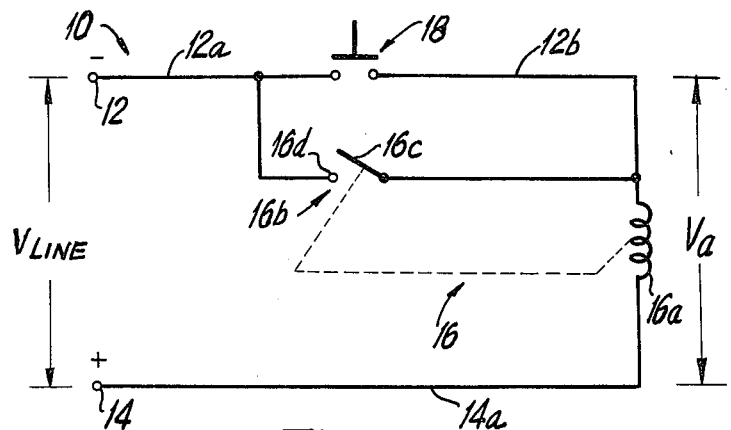
FIG. 1 is an electrical schematic representation of the basic circuit of the present invention, the circuit shown being primarily useful where the telephone line voltages are non-fluctuating or uniform.

Referring now specifically to the drawings, in which identical or similar parts are designated by the same reference numerals throughout, and first referring to FIG. 1, a hold circuit in accordance with the present invention will first be described which is usuable under limited telephone line voltage conditions. In this connection, it is pointed out that the voltages across telephone lines may vary substantially. The variations are both a function of the voltage levels applied at the telephone central office as well as the voltage drop between the central office and the subscribers's units. Consequently, the voltages appearing across the telephone lines are to a great extent a function of the distance of the subscriber from the central office. With the positive level typically being connected to the system ground, and with approximately −50 volts applied at the central office, voltages which can be expected at the average subscribers' locations are −25 volts when the telephone handset is "on the hook" or nestled in the telephone cradle and approximately −5 volts when the telephone handset is "off the hook" or removed from the cradle. The circuit which will be described in FIG. 1 is useful in the above described idealized or average conditions wherein the voltage swing across the telephone line is substantial. However, as a practical matter, the voltages and available currents of the telephone lines may fluctuate substantially. For example, the range of currents supplied from the telephone central office may vary anywhere from 26 ma. to 150 ma., this being a function of the distance of the subscriber's phone location from the telephone central office location. For this reason, a modified circuit, shown in FIGS. 3 and 4, is useful under all anticipated conditions of the telephone line voltages.

The basic hold circuit 10 shown in FIG. 1 includes a pair of terminals 12, 14 connectable to a pair of telephone lines (not shown). A relay 16 includes a relay coil 16a and a normally open switch 16b when the relay coil 16a is not energized. The relay switch 16b includes a movable contact 16c and a fixed contact 16d. When the relay coil 16a is not energized, the movable contact 16c is disconnected from the fixed contact 16d.

The fixed contact 16d is connected to the negative terminal 12 and the latter is connected, by means of a normally open momentary contact switch 18, to one terminal of the relay coil 16a. The movable contact 16c is connected to the same terminal of the relay coil to thereby place the switch 16b in parallel connection across the momentary contact switch 18 when the relay coil is energized. The other terminal of the relay coil 16a is connected to the positive terminal 14. While switch 18 is shown as including mechanical contacts, it should be clear that an electronic switch valve which does not have mechanical contacts can be used to provide an equivalent current path when the switch 18' is manually actuated.

Figure 2:
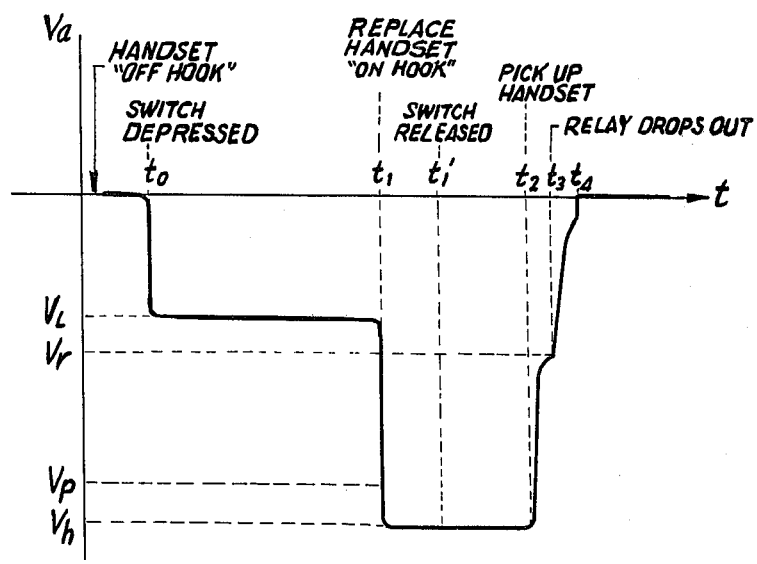
FIG. 2 is a graphical representation, along a time axis, indicating the voltages which are generated across the relay coil shown in FIG. 1 which cause the relay to become energized and deenergized as a function of the disposition of the telephone handset "on" or "off" the hook.

Referring to FIGS. 1 and 2, the telephone line voltage is designated by the variable voltage V Line and the voltage which appears across the relay coil 16a is designated by the variable voltage $V_a$. The range of voltages between the pull-in voltage $V_p$ and release voltage $V_r$ of the relay 16 is made smaller than and is included within the anticipated voltage swing range on the telephone lines as the telephone handset is removed off and then replaced on the hook.

The operation of the circuit of FIG. 1 will now be described. As is well known, telephone lines are seized or held when a sufficiently low resistance is placed across the telephone lines. When a telephone handset is taken "off the hook," an effective resistance of approximately 100 ohms is placed across the telephone lines at terminals 12 and 14, this being sufficient to hold the same. As soon as the telephone handset is replaced "on the hook," the handset resistance is removed from across the lines effecting release of the telephone lines. Replacing the handset "on the hook" also effects a reduction of the total current drain originating from the telephone central office and, consequently, a higher voltage is developed across the lines. The latter condition releases the telephone lines. With the circuit of FIG. 1, the telephone lines can be captured and held for extended period of times, subject to the conditions to be described below, even if the telephone receiver is placed back "on the hook."

When two parties have a discussion, the party having the circuit shown in FIG. 1 connected across the telephone lines may place the other party on "hold" by depressing the momentary contact switch 18 and maintaining the same in a depressed condition until the telephone handset is placed "on the hook." As mentioned above, as soon as the telephone handset is back "on the hook," the line voltage $V_{Line}$ increases to a higher voltage $V_h$ sufficient to energize the relay 16 and cause the movable contact 16a to move to the fixed contact 16d. The pulling in of the relay 16 establishes an alternate circuit path in place of the momentary contact switch 18 and causes the voltage $V_{Line}$ to be continuously applied across the relay coil 16a after the switch 18 is released. This effectively latches the relay 16 and causes the same to continue to be energized so long as the telephone handset remains "on the hook." The resistance of the relay coil 16a is selected in this embodiment to have a resistance approximately equal to the effective resistance of the telephone handset across the lines when the same is "off the hook." Thus, depression of the momentary contact switch 18 places a resistance, that of the relay coil 16a, across the telephone lines to replace the effective resistance of the telephone handset when the latter is replaced "on hook."

In FIG. 2, the voltage relationships across the relay coil are shown. The voltage $V_h$ represents the higher voltage across the relay coil at the time when the momentary switch 18 is in a depressed condition and at the moment subsequent to hanging up the telephone handset. The voltage $V_L$ is the lower voltage across the relay coil and corresponds to the condition when the switch 18 is depressed and the receiver is "off the hook." In the idealized condition discussed above, the voltage $V_h$ is typically between 15 and 25 volts while the voltage $V_L$ is between 3 and 5 volts. The voltages $V_p$ and $V_r$ respectively represent the pull-in and release voltages of the relay 16. It is an important feature of the circuit shown in FIG. 1 that the range of voltages between the pull-in and release voltages of the relay 16 be smaller and be included within the voltage swing range on the telephone lines. With this arrangement, when the telephone handset is again picked up "off the hook," the voltage across the telephone line $V_{Line}$ drops sufficiently to cause the voltage $V_a$ to assume the release voltage value $V_r$. Thus, as soon as the telephone handset is picked up "off the hook," the hold circuit 10 automatically deenergizes the relay 16 and permits the telephone lines to be released upon replacing of the telephone handset "on the hook." This automatic release feature of the circuit 10 is an important feature of the present invention.

Still referring to FIG. 2, the voltage across the relay coil 16a is normally zero until such time $t_0$ when the hold circuit 10 is brought into operation. This is true whether or not the telephone handset is on or off the hook due to the normally open condition of the momentary contact switch 18 and the switch 16b. When the telephone hands 5t is "off the hook," and one party is conversing to another, depression of the momentary contact switch 18 at time to cause a low voltage $V_L$ to be applied across the relay coil 16a. However, since the telephone handset is "off the hook" and a small voltage $V_L$ appears across the relay coil 16a, this is not sufficient to pull the relay 16 in. This condition is shown as taking place at a time $t_0$. Hanging up the handset "on the hook" at time $t_1$ while maintaining the switch 18 closed or depressed causes a high voltage $V_h$ to be applied to the relay coil 16a by way of switch 18 since the effective shunting resistance of the handset is removed from across the line. As is noted, the voltage $V_h$ exceeds the pull-in voltage $V_p$ and the relay coil 16a is placed across the telephone lines. In this arrangement, it is only important that the voltage $V_h$ be greater in magnitude than the pull-in voltage $V_p$ of the relay and that the voltage $V_L$ is lower than the release voltage $V_r$. However, the relay coil 16a must have a resistance sufficiently small to insure that the telephone lines remain captured and are not released.

The hold circuit 10 holds the telephone lines subsequent to time $t_1$ and $t_i$ until time $t_2$ when the telephone handset is picked up. At such time, the voltage across the relay 16a tends to return to the voltage $V_L$ which is below the release voltage of the relay $V_r$ and assumes the release voltage $V_r$ at time $t_3$ in FIG. 2. The movable contact 16c disengages from the fixed contact 16d at time $t_4$, the time interval indicated between $t_3$ and $t_4$ is representative of the dropout time constant of the relay 16. Clearly, the voltage in this condition across the relay coil 16a returns to zero upon deenergization of the relay 16 and the opening of the switch 16b at time $t_4$. While the telephone lines are still being held by the picked up telephone handset, the hold circuit 10 is effectively automatically disconnected and permits the telephone lines to be released upon replacing the telephone handset "on the hook." The times $t_0$, $t_1$, $t_1'$, $t_2$, $t_3$ and $t_4$ are not necessarily shown spaced to scale. The showing is only for facilitating the description and for purposes of clarity.

As suggested above, the hold circuit 10 of FIG. 1 has limited applications to specified line voltage conditions. Of primary importance is that the voltage $V_a$ have a magnitude greater than the release voltage $V_r$ prior to the time that the telephone handset is picked up at time $t_2$. However, to insure that the telephone lines are released by the circuit 10, it is imperative that the voltage $V_a$ drop below the relay release voltage $V_r$ at such time that the telephone handset is picked up at time $t_2$. In localities where the telephone line voltages are higher than normal or with subscribers very close to the central office, the hold circuit 10 may not be suitable since it would not release the telephone lines upon the picking up of the handset "off the hook" if $V_a$ does not drop below $V_r$.

To make the circuit 10 more universally useful, a slightly modified circuit 20 is shown in FIGS. 3 and 4 wherein a lamp 22 in parallel circuit connection with a capacitor 24 are connected in series with the switch 16b. The lamp 22 is a resistance element and forms a voltage divider network with the relay coil 16a. Now, when the switch 16b is closed due to energization of the relay coil 16a, the line voltage $V_{Line}$ is divided into voltages $V_a$ and $V_b$. For reasons which will be described hereafter, the voltage $V_b$ is advantageously made larger than the voltage $V_a$. Thus, when the resistance of the relay coil 16a is too large relative to the resistance of the lamp 22, a shunt resistor 26 may be placed across the relay coil 16a to lower the voltage of $V_a$ or increase the ratio of the voltages $V_b$ to the voltage $V_a$.

In FIG. 4, the voltage $-V_o$ represents the voltage applied to the telephone lines at the central office. The resistor 28 represents the resistance of the telephone lines between the central office and the subscriber's location, the negative telephone line being shown connected to the terminal 12. The resistor 30 represents the effective resistance placed across the telephone lines when a switch 32 is closed upon the picking up of the handset "off the hook." The resistance 30 is typically 100 ohms. The reasons for the large variations of fluctuations in the telephone line voltages $V_{Line}$ at the subscriber terminals 12, 14 is primarily due to the variations in $-V_0$ and in the resistance 28, as suggested above. Consequently, the voltages $V_{Line}$ at the subscribers' terminals may be anywhere between 3 and 10 volts when the receiver is picked up or the switch 32 is closed. The voltage at the terminals 12, 14 may also be anywhere between an approximately 10 and 25 volts when the telephone handset is on the cradle or when the switch 32 is opened. Due to this large variation of voltages, it is sometimes difficult to anticipate which pull-in and release relay voltage characteristics are necessary to insure proper operation of the hold circuit and automatic release as described above. The provision of the capacitor 24 eliminates the criticality of the relay voltage characteristics and insures that the relay automatically releases independently of the variations on the telephone line voltages.

Figure 5:
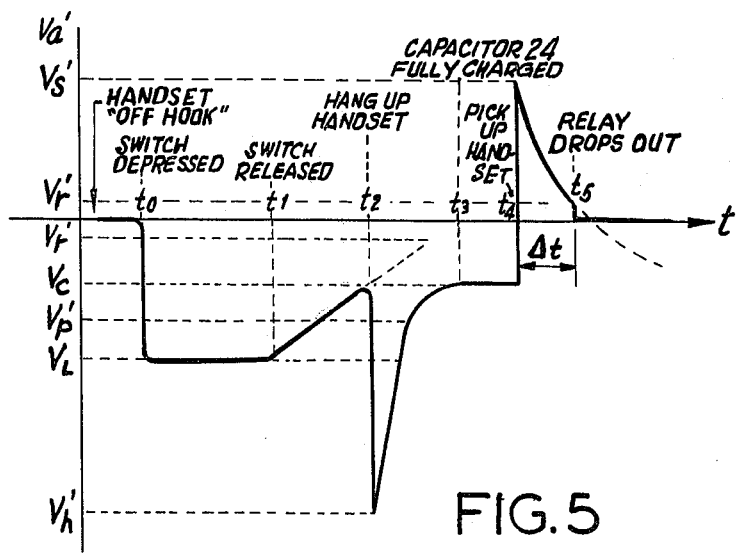
FIG. 5 is similar to FIG. 2 but indicating a reversal in polarity across the relay coil due to the presence of the capacitor and lamp circuit, the reversal of polarity assuring that the voltage across the relay coil goes through a zero voltage condition to thereby assure that the relay becomes deenergized for the purpose of releasing the telephone lines automatically.

The operation of the circuit 20 will now be described in connection with FIG. 5. At time $t_0$, with the handset "off hook," the momentary contact switch 18 is depressed. A low voltage $V_L$ is thereby directly applied to the relay coil 16a. In this instance, it may be safely assumed that the relay 16 pull-in voltage requirement is of a lower magnitude and $v_p'$ may assume an even lower magnitude than the voltage represented by $V_L$. The momentary depression of the switch 18 thereby actuates the relay 16 and the switch 16b is closed.

Upon release of the switch 18 at time $t_1$, the above-mentioned voltage divider network is placed across the telephone lines in series with the relay coil 16a. At time $t_2$, when the telephone handset is replaced "on-hook," and since the capacitor 24 cannot change its voltage instantaneously, the voltage $V_a$ increases instantaneously to $V_h'$ and immediately thereafter decreases in an exponential manner as the voltage across the capacitor 24 builds up to its steady state value at $t_3$. At such time $t_3$, the telephone line voltage at the input to the device 20 is shared proportionately by the relay coil 16a and the above-mentioned divider network. The relay voltage $V_a'$ and at this time is designated as $V_c$ in FIG. 5. Current flow through the lamp 22 may serve as a visual indication that the hold circuit 20 is in an activated mode and thus also serves to indicate that the telephone lines are in a captured condition.

The voltage across the relay coil 16a drops to and remains at an intermediate voltage $V_c$ during the period $t_3$ to $t_4$ when the telephone handset is again picked up. At this time $t_4$ the line voltage across the terminals 12, 14 decreases substantially due to the closing of the switch 32. However, since the voltage $V_b$ cannot change momentarily across the capacitor 24, there is an instantaneous reversal of voltages across the relay coil 16a to a positive voltage $V_s'$ as shown in FIG. 5, with immediate exponential decay in voltage as the capacitor 24 discharges and readjusts its voltage level to a new low negative line voltage. The exponential drop in voltage from a positive to a negative voltage is shown partially in dashed outline. As the voltage tends to pass through the zero voltage level across the relay coil 16a, it drops below the release voltage $V_r'$ of the relay becomes deenergized at the time $t_5$. At this time, the switch 16b opens and an open circuit results wherein the voltage across the relay coil 16a drops to zero. The time $\Delta t$ between $t_4$ and $t_5$ is exaggerated for purposes of clarity and description. As in FIG. 2, the time relationships are not drawn to scale.

By way of example only, if the voltage $V_{Line}$ across terminals 12, 14 is −25 volts when the telephone handset is replaced "on hook" subsequent to depression of switch 18, $V_a'$ may be selected to be −10 volts and the voltage $V_b$ would then be −15 volts. When the holding party wants to resume talking and thus removes the telephone handset "off the hook" the terminal voltage $V_{Line}$ drops to −5 volts, the voltage $V_b$ remains momentarily at −15 volts and therefore the voltage $V_a$ must become equal to +10 volts. This reversal in voltages from −10 to +10 volts assures that the voltage $V_a$ across the relay coil goes through a zero crossing in each instance and insures automatic release of the holding circuit of the present invention, irrespective of the telephone line voltages, as soon as a telephone handset is picked up subsequent to a hold condition.

It is important to note that the provision of a voltage divider network formed by the lamp 22 and the relay coil 16a in parallel with resistor 26, which includes a capacitor 24 across the lamp 22, makes the sensitivity of the circuit 20 substantially independent of the absolute telephone line voltage conditions. Instead, it is the ratio of the voltages in $V_a$ and $V_b$ that becomes important, not the specific values of the d.c. voltage conditions on the telephone lines.

The capacitor 24 may be polarized as shown with the positive terminal thereof connected to the relay coil 16a. When such a polarized capacitor is utilized, the terminal 12 must be connected to the negative terminal of the telephone lines with the positive terminal thereof connected to the system ground as shown. Also, a diode 34 is advantageously connected across the coil 16a as shown to prevent damage to the capacitor in the event that the correct polarity for the terminals 12 and 14 is not observed in connecting to the telephone lines. It should be clear, however, that the same circuit may be utilized with a non-polarized capacitor, in which case the diode 34 may be eliminated and the circuit connections at the terminals may be interchanged at will. However, non-polarized capacitors of sufficient capacity are generally more expensive.

While the circuits 10 above described typically does require that the momentary contact switch 18 be maintained in a depressed condition until the telephone handset is placed "on the hook" in order to cause sufficient voltage developed across the lines to energize the relay 16, because the circuit 10 has three requirements for proper operation. Firstly, it is necessary that the relay 16 - pull-in voltage (represented by $V_p$ in FIG. 2) be of a higher magnitude than the line voltage $V_{Line}$ the instance when the telephone handset is then "off hook" condition (represented by $V_L$ in FIG. 2). Additionally, the release voltage of the relay (represented by $V_r$ in FIG. 2) also be of a higher magnitude than the voltage or value represented by $V_L$. Finally, for proper operation of circuit 10, it is necessary that the momentary switch 18 be maintained depressed until the telephone handset is restored to its "on hook" position after actuation of the "hold" circuit is initiated.

These requirements do not generally apply to the circuit 20 shown in FIGS. 3 and 4. Thus, with respect to the circuit 20 the operating characteristic of the relay 16 represented in FIG. 5 are such that the pull-in and release voltages, $V_p'$ and $V_r'$ respectively may advantageously be of a lower magnitude than the "off hook" line voltage $V_L$ and the momentary switch 18 may thereby be depressed only momentarily and need not be maintained in a depressed condition until the handset is restored to its "on hook" position. The switch 18 may be released instantaneously in circuit 20 and the relay 16 maintains its energized state due to the above-mentioned relay characteristics or voltage requirements. The release of the relay 16 when the telephone handset is again removed to an "off hook" condition is accomplished by the resultant voltage reversal on the relay coil 16a brought about by the inclusion and the action of the capacitor 24 as a part of the circuit network 20.

The principles of the present invention may also be achieved by utilizing semiconductor switches or latching elements in place of the conventional relay described above. Referring to FIG. 6, a circuit 20a includes resistor 36 connected in series with the lamp 22, and the capacitor 24a is connected across the series connection of the resistor 36 and the lamp 22. A Triac 38 is connected with the electrode 40 thereof being connected to the lamp 22 and the electrode 42 being connected to the telephone line 12. The control electrode 44 is connected to the switch 18 as shown.

While not concerned directly with the operation of the circuit, a capacitor 46 is connected between the electrodes 42 and 44 and serves as an R-F bypass to prevent actuation of the Triac 38 by RFI interference or spurious transients which may be generated in the circuit. A gate leak resistor 48 is connected between the control electrode 44 and the telephone line 12 and serves as a return path for control electrode current.

The operation of the hold circuit 20a will now be described. Initially, the Triac 38 presents an open circuit between terminals 40, 42 and continues in this condition until a sufficiently high voltage is applied to the control electrode 44. This occurs when the switch 18 is depressed while the telephone handset is "off the hook."

Once the Triac 38 becomes conductive, the switch 18 may be released or opened and a current continues to flow through the resistor 36, lamp 22 and Triac 38. The capacitor 24a charges up to the voltage which appears across the series combination of the resistor 36 and lamp 22. Hanging up the handset "on the hook" increases the voltage across the telephone lines 12, 14, this increasing the current through the lamp 22 and the Triac 38 to thereby increase the voltage which is stored across the capacitor 24a.

When the telephone handset is removed or picked up, "off the hook," the voltage across the telephone lines 12, 14 decreases substantially. Since the voltage across the Triac 38 in the conducting mode thereof is small, it is important for the voltage developed across the capacitor 24a during initial charging thereof to exceed the lower voltage across the telephone lines 12, 14 when the telephone handset is picked up "off the hook." The charging initially takes place subsequent to depression of the switch 18.

When the voltage across the capacitor 24a exceeds the lower voltage across the terminals 12, 14 upon the picking up of the telephone handset, a negative or reverse voltage is effectively applied across the Triac 38 to insure that the latter becomes non-conductive. At such time, the circuit reverts to its initial condition wherein the Triac assumes an open circuit between the terminals 40, 42. The capacitor 24a fully discharges through the resistor 36 and the lamp 22.

While the lamp 22 has been suggested above as being as incandescent lamp, it should be clear that such a lamp may be of the LED or a LCD type. Similarly, any other current operated visual indicator may be utilized to provide an indication that the telephone lines are being held. Alternately, the lamp 22 may be omitted entirely and a resistor of appropriate value substituted in its place.

With reference to FIG. 7 showing a circuit 20b, the same description as for circuit 20a above applies with the exception that an SCR 50 is utilized in place of the Triac 38. The terminals 52, 54 and 56 are connected similarly as are the corresponding terminals 40, 42 and 44. The operation of the circuit is similar to that described in connection with FIG. 6 except that in the case of the circuit 20b the correct polarity must be observed when connecting terminals 12 and 14 to the telephone lines consistent with the relative connections of the SCR 50 electrodes. While no damage will result to any of the components of the circuit 20b if connected to the telephone lines with the improper polarity, the circuit will not be operative since the SCR 50 cannot be triggered under the improper polarity conditions. The advantage of circuit 20a and 20b over circuit 20, aside from the fact that circuit 20a and 20b are of solid state design, are as follows: (1) In circuits 20a and 20b the capacitor 24a shunting the lamp 22 is of considerably lower capacitance than the capacitance required for capacitor 24 of circuit 20. In fact the capacitance of capacitor 24a is of such low magnitude that it is available in inexpensive standard non-electrolytic, non-polarized assortment of capacitors. Aside from the savings in the cost factor this advantage is significant because proper polarity does not have to be observed in connecting circuits 20a to the telephone lines and with respect to circuit 20b of the proper connecting polarity is not observed, although the circuit will not be operative as mentioned above, nonetheless no damage to any of the component of the circuit will result. Consequently, the insertion of a diode into circuits 20a and 20b, unlike as is the case with circuit 20, serves no useful purpose.

As should be clear from the above description, the present invention is both simple in construction and economical to manufacture. It may be connected to the telephone lines and in association with any telephone instrument, independently of the number of extensions which are connected across the lines. Additionally, in the case of multiple independent incoming telephone lines connected to a single telephone instrument, provided with pushbuttons for selection of any one of the multiple lines, a separate hold circuit can be connected to each independent incoming telephone line so that more than one party may be held on "hold" simultaneously if so desired. Of primary importance is that the circuit of the present invention is capable of capturing and holding the telephone lines after the telephone handset is placed "on the hook" and automatically and reliably releasing said telephone lines as soon as any handset of any telephone extension associated with these lines is picked up "off the hook." An additional advantageous feature of the present invention is the automatic deenergization of the relay 16 as soon as the other party to the discussion hangs up the telephone handset and a "disconnect pulse" appears on the telephone lines. Such disconnect pulses are in the form of interruption of telephone line current when one party to a conversation hangs up, just prior to the appearance of a dial tone. Such interruptions of current may typically be 50 miliseconds, sufficient in time duration to remove the voltage from the relay coil 16a and release the relay. If the party having the above described circuit connected to the telephone lines and in the "hold" conditions places the telephone handset "on the hook" and the other party hangs up, the hold circuits would be disconnected from the telephone lines and the associated telephone handsets are placed in condition for receiving incoming calls. In the case of the circuits 20, 20a and 20b the appearance of the "disconnect pulse" turns off the lamp 22. This feature is an improvement over many of the prior art hold circuits wherein the hold buttons continue to blink, sometimes indefinately, unless the mechanical condition of the telephone instrument is manually altered at the location where the instrument hold button was depressed.

The hold circuits can also be used to "busy out" a telephone line to prevent disturbances due to telephone ringing. This may be achieved by the subscriber having an above hold circuit dialing his own telephone number. A busy signal appears on the line. If the switch 18 is now depressed and the handset is placed "on the hook," the busy line condition will continue indefinately until the telephone handset is taken "off the hook." The circuits under discussion thus permit the telephone handset to be "on hook" without removing the "busy" line condition. Also, since the telephone handset is not merely left "of the hook," as is typically done to prevent ringing, the loud, disturbing "off hook" signals are avoided.

In the case of some central office exchanges which may introduce a disconnect pulse in the "busy out" scheme cited above, the switch 18 may be provided with means for latching the switch in the make or mode condition to maintain this switch in a permanent "make" condition until released. Maintaining the switch closed for an extended period of time in this manner permits the use of the above described hold circuit for busying out the telephone lines. Instead of providing a temporary contact switch with the latching feature, an alternate approach is to provide an additional switch, designated by the reference number 18' in FIGS. 3–7, which is placed across or in parallel with the temporary contact switch 18. The "busy out" switches 18' may be in the nature of a single-pole switch which are manually actuatable between permanently open and closed conditions. In this manner, the telephone lines may be loaded for extended periods of time when the "busy out" switch 18' is closed to provide the desired "busy" condition on the telephone lines independently of the position of the telephone handset. While switch 18 is shown as including mechanical contacts, it should be clear that an electronic switch valve which does not have mechanical contacts can be used to provide an equivalent current path when the switch 18' is manually actuated.

In addition, lamp 22 of circuits 20, 20a and 20b can serve to indicate whether any extension phone on a particular line is in use without having to lift the handset off and associated extension phone and eavesdropping on the conversation. This is accomplished by depressing switch 18 and observing lamp 22. If the lamp 22 lights, this is an indication that the lines are free while if it does not light this serves to indicate that at least one extension on the telephone lines is in use by another party. It is noted that when the switch 18 is depressed, a current will flow through the lamp 22, where normally this current would be insufficient to light the lamp 22 when at least one extension is in use as mentioned above. However, if the lamp 22 has a low enough operating characteristic, the lamp 22 may obviously be dimly lit when the other extension is in use, where the dim light would be an indication thereof, in contrast to the bright light caused by the lines being free, as would be obvious to one skilled in the art.

While the above described circuits perform a "hold" and automatic "release" function, simplified versions of these circuits may be utilized to "hold" a telephone line while requiring manual "release" thereof. For example, in FIGS. 6 and 7, the semiconductor latching elements 38 and 50 respectively alone can be placed across the telephone lines, possibly by way of a series resistor, to draw line current upon depression of momentary switch 18. To release the lines a series switch, for example, may be opened to interrupt the current through the latching elements to terminate the conductive conditions thereof, this releasing the telephone lines.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A hold circuit for at least one pair of telephone lines connected to at least one telephone instrument, the telephone lines requiring a predetermined current flow therethrough to "hold" and seize the same, and exhibiting a higher voltage when all handsets of all associated telephone instruments connected to the pair of telephone lines are "on hook" and a lower voltage when a handset of any of the associated telephone instruments is "off hook," where said higher and lower telephone line voltages may vary in magnitude, the hold circuit comprising a pair of terminals adapted to be connected to a pair of telephone lines; latching means connected to said terminals for inhibiting said predetermined current flow through the hold circuit in a first mode and for permitting at least said predetermined current to flow through the hold circuit in a second mode; manually actuable switching means connected to said latching means for actuating the latter into said second mode when said switching means is manually actuated to thereby cause the hold circuit to seize the telephone lines and said latching means reverting to its said first mode when a handset of any of the associated telephone instruments is subsequently rendered "off hook," where the hold circuit automatically releases its seizure of the telephone lines, load means consisting of at least visual indicator means, a capacitor connected in parallel with said load means, the latter parallel combination being connected in series with said latching means, said load means being effective to insure that a voltage developed across said capacitor causes said latching means to become deenergized and resultant release of the telephone lines by the hold circuit upon subsequently removing any associated telephone handset "off the hook."

2. A hold circuit as defined in claim 1, wherein said visual indicator means comprises a lamp, said lamp providing the necessary resistance to insure said voltage across said capacitor.

3. A hold circuit as defined in claim 1, wherein said load means has a resistance greater than the effective resistance of said latching means to insure that said voltage developed across said capacitor is greater than the voltage across said latching means in the hold condition when said latching means is closed, where subsequent removal of any associated telephone handset "off the hook" causes said latching means to become deenergized and resultant release of the telephone lines by the hold circuit.

4. A hold circuit as defined in claim 1, wherein said switching means comprises a "busy out" switch being actuatable between permanently open and closed conditions, whereby the telephone lines may be loaded for extended periods of time when said "busy out" switch is closed to provide a "busy" condition on the telephone lines independently of the condition of the telephone handset.

5. A hold circuit as defined in claim 1, wherein said latching means comprises a relay having a coil and normally opened contacts when said coil is not energized; and wherein said switching means comprises a normally open momentary switch, said switch and relay coil being connected in series to each other and the series combination being connected across said pair of terminals for connection across the telephone lines, said switch being connected in parallel to the normally open contacts of said relay, whereby the hold circuit seizes the telephone lines when said switch is momentarily actuated and said hold circuit releases its seizure of the telephone lines upon a handset of any of the associated telephone instruments being subsequently rendered "off hook".

6. A hold circuit as defined in claim 5, wherein said parallel combination of said load means and said capacitor is connected in series with said relay contacts, said load means and said relay coil providing a voltage divider network when said relay contacts are closed.

7. A hold circuit as defined in claim 6, wherein said visual indicator means comprises a lamp, said lamp providing the necessary resistance for the formation of said voltage divider network.

8. A hold circuit as defined in claim 7, wherein said lamp has ignition characteristics which result in lighting of the same upon passage of said predetermined current flow therethrough, said lamp thereby providing a visual indication in the steady state condition of the hold circuit when the hold circuit is seizing the telephone lines.

9. A hold circuit as defined in claim 6, wherein a resistor is connected in parallel to said relay coil, said resistor and relay coil forming one effective resistance of said voltage divider network which is lower than said load means.

10. A hold circuit as defined in claim 5, wherein one terminal of said relay coil is connected to the positive telephone line and wherein one terminal of said capacitor is selectively connected to the negative telephone line, said capacitor being polarized and having the positive other terminal thereof connected to the other terminal of said relay coil.

11. A hold circuit as defined in claim 10, further comprising a diode connected across said relay coil and arranged to be non-conductive when the telephone lines are applied to the hold circuit terminals with the proper voltage polarities.

12. A hold circuit as defined in claim 1, wherein said latching means comprises a semi-conductor latching element having a pair of current conductive electrodes and a control electrode, said current conductive electrodes being connected to said terminals and said switching means being connected to said control electrode, said latching element being in a current conductive mode when a voltage is applied to said control electrode by manual actuation of said switching means and reverting to a non-conductive mode only when the current through the same is temporarily interrupted; said parallel combination providing current interrupting means for interrupting current flow in said semi-conductive latching element when an associated telephone handset is rendered "off the hook," whereby the hold circuit automatically releases its seizure of the telephone lines.

13. A hold circuit as defined in claim 12, wherein said semi-conductor latching element comprises a Triac.

14. A hold circuit as defined in claim 12, wherein said semi-conductor latching element comprises an SCR.

15. A hold circuit as defined in claim 12, including a current limiting resistor; said indicator means being connected in series with said resistor, said resistor and indicator means being connected in series with said latching element across said telephone lines; said switching means comprising a normally open switch connected to said control electrode and to the junction point formed by said resistor and said indicator means.

16. A hold circuit as defined in claim 15, wherein said current interrupting means includes said capacitor being connected across the series combination of said resistor and said indicator means.

17. A hold circuit as defined in claim 1, wherein said switching means comprises a momentary contact switch, and further comprising a "busy out" single pole switch in parallel with said momentary contact switch, said single pole switch being actuatable between permanently open and closed conditions, whereby the telephone lines may be loaded for extended periods of time when said "busy out" switch is closed to provide a "busy" condition on the telephone lines independently of the condition of the telephone handset.

18. A hold circuit as defined in claim 1, further comprising a lamp connected in series with said latching means in the current conductive mode thereof, whereby failure of said lamp to light brightly upon manual actuation of said switching means may provide an indication of an "off hook" condition of any one of said associated telephone instruments.

* * * * *